June 10, 1969 W. F. KUHLMAN 3,448,717
AUTOMOBILE WHEEL WELL UNDERCOATING APPARATUS AND METHOD
Filed June 3, 1965 Sheet 1 of 4

INVENTOR:
WALTER F. KUHLMAN.
BY

ATT'YS.

INVENTOR:
WALTER F. KUHLMAN.
ATT'YS.

June 10, 1969     W. F. KUHLMAN     3,448,717
AUTOMOBILE WHEEL WELL UNDERCOATING APPARATUS AND METHOD
Filed June 3, 1965

INVENTOR:
WALTER F. KUHLMAN.
BY
ATT'YS.

United States Patent Office 3,448,717
Patented June 10, 1969

3,448,717
AUTOMOBILE WHEEL WELL UNDERCOATING APPARATUS AND METHOD
Walter F. Kuhlman, Norwalk, Ohio, assignor to Kuhlman Machine Company, Norwalk, Ohio, a corporation of Ohio
Filed June 3, 1965, Ser. No. 460,927
Int. Cl. B05c 11/02; B44d 1/52
U.S. Cl. 118—2                                         18 Claims

ABSTRACT OF THE DISCLOSURE

An automobile is undercoated by moving it to a particular position, raising the body relative to the wheels to increase the spacing between the fender wells and the wheels, and moving spray apparatus into the space to direct undercoating material against the fender wells. The spraying apparatus includes a support which is moved toward and away from the automobile in a path aligned with the axis of the wheel. The spray heads are located at the end of an arm on the support, which arm has a radius exceeding that of the wheel so as to position the spray heads just outside the circumference of the wheel and move them in an arcuate path back and forth around the wheel.

---

This invention relates to apparatus and a method for applying undercoating material to a vehicle and more specifically to apparatus and a method for automatically spraying undercoating material on the undersurface of a fender well around a wheel of a vehicle.

The apparatus and method according to the invention are particularly used for applying undercoating and sound-deadening material to a new vehicle during production, although in specific instances, they might also be used for undercoating older vehicles in job-lot applications. In the conventional production process for many vehicles, the front wheels are assembled with the body of the vehicle prior to the assembly of the front fenders. This causes a problem in the application of undercoating material to the fenders and particularly the front fenders since the material must be applied with the wheels in place, rendering the process more difficult. This problem does not ordinarily exist with the rear fenders or rear quarter panels because these are assembled, and thus can be coated, prior to the assembly of the rear wheels. Hence, it is relatively easy to apply the undercoating to the rear quarter panels without any obstruction with which to contend.

Heretofore, the undersurfaces of the front fenders normally have been manually coated by operators, one of which stands on each side of the vehicle as it passes along the production line. The labor cost involved is substantial and the coating applied is not always as uniform as desirable.

The present invention relates to apparatus and method for automatically applying the coating to the undersurface of a vehicle, usually the front fender wells thereof. The apparatus and method according to the invention enable a substantial reduction in labor costs by the elimination of the two men discussed above and also enable the coating material to be applied more uniformly, thereby eliminating excessively thick or thin portions and missed areas. In accordance with the invention, coating material spray nozzles are moved under each front fender, swung in an arcuate path around the wheel, and then retracted. In the preferred form, the vehicle body is first partially raised to increase the space between the wheel and the fender to further facilitate the coating operation. In addition, the application of coating material can be stopped through any particular nozzle during any part of the arcuate path through which the nozzles move.

It is, therefore, a principal object of the invention to provide apparatus and method for automatically applying coating material to an undersurface of a vehicle.

Another object of the invention is to provide means and a method for automatically controlling spray nozzles and for moving them in predetermined paths to coat the undersurface of a fender well around a wheel of a vehicle.

Still another object of the invention is to provide means for automatically controlling the flow of coating material to coating material nozzles as they are moved in a predetermined path relative to a vehicle body.

Many other objects and advantages of the invention will be apparent from the following detailed description of a preferred embodiment thereof, reference being made to the accompanying drawings, in which.

Figure 1:
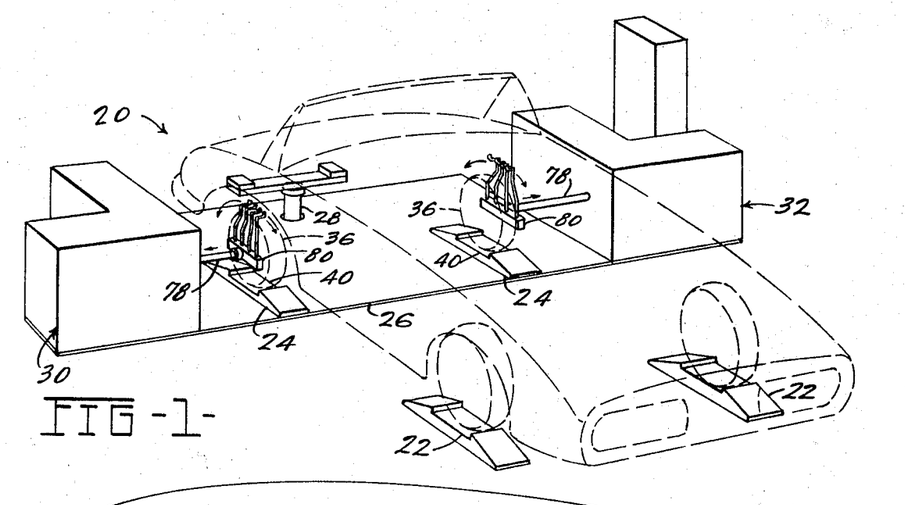
FIG. 1 is a somewhat schematic view in perspective of the overall apparatus according to the invention for applying coating material to the front fender wells of a vehicle, shown in dotted lines.

Referring to the drawings and more particularly to FIG. 1, overall spray apparatus embodying the invention is indicated at 20 and includes two rear wheel receivers or recess means 22 and two front wheel receivers or recess means 24 which receive the four wheels of a vehicle, shown in dotted lines, to be treated. The apparatus further includes a front platform or plate 26 positioning a jack 28 which engages the undercarriage of the vehicle and raises it slightly to facilitate undercoating. When the vehicle is in position and raised, spray heads operated by a left hand spray control unit 30 and a right hand spray control unit 32 are moved under front fender wells of the vehicle and directed in arcuate paths around the wheels thereof to spray the undersurfaces of the wells. A control cabinet 33 is located near the unit 32.

Figure 2:
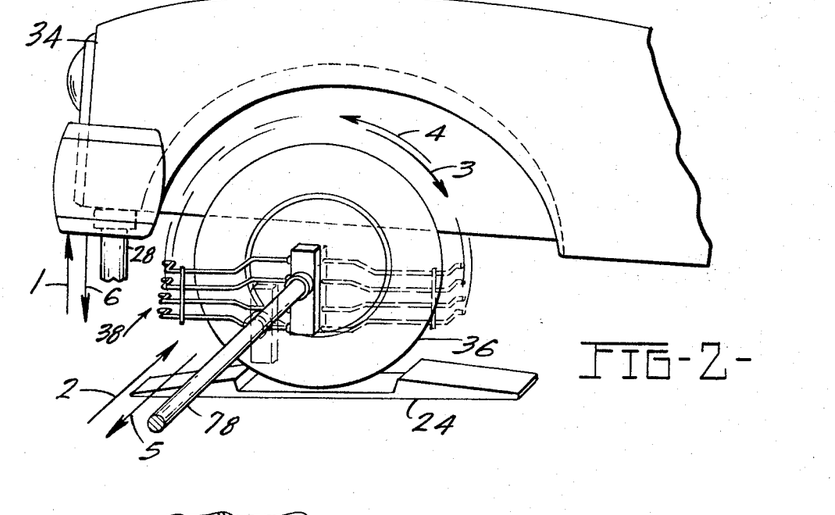
FIG. 2 is a schematic, fragmentary view in perspective showing a coating sequence effected by operation of the apparatus of FIG. 1.

The coating steps in the undercoating operation are schematically represented in FIG. 2. When the vehicle is properly positioned with the wheels on the four receivers 22 and 24, the jack 28 is first operated to raise the body of the vehicle in the direction of the arrow 1 in FIG. 2. The jack raises the body and front fenders 34 but the body is not raised sufficiently to left front wheels 36 off the receivers 24. If the wheels were so raised, the sequence of operations would be interrupted, as will be discussed subsequently; further, there would be no advantage in raising the vehicle more because the sole purpose is to increase the space between the fenders 34 and the wheels 36 and additional space is not achieved if the wheels are raised with the fenders.

When the vehicle is raised, a spray head 38, to be discussed in detail subsequently, is moved forwardly toward each of the wheels 36 and partly into the space between the wheel and the fender. This second step is represented by an arrow 2. In this position, the spray head is next moved in an arcuate path, the center of which preferably is coaxial with the axis of the wheel 36 and the radius of which exceeds that of the wheel 36. The path extends through an angle of from approximately 140° to 200°, this third step being represented by an arcuate arrow 3. Upon reaching the end of the arcuate path, the spray head 38 can be swung back through the same path, this fourth step being represented by another arcuate arrow 4. Coating material is sprayed during the back and forth arcuate movements of the spray head with the sprays directed in a manner to fully coat the fender wells, the sprays being arranged in preselected directions for this purpose.

In the event that certain parts of the fender well are not to be coated, the spray control units 30 and 32 have means for shutting off the coating material during portions of the arcuate movements. This might be desirable, for example, where fasteners under the fenders to receive shock absorbers are to be left free of coating material. In some instances, a single pass of the spray head around the wheel may be sufficient to provide adequate coating for the fender well. The spray head unit then can be retracted after reaching the end of the third step. On the other hand, more than the one back and forth pass might be desirable, in which case steps 3 and 4 can be repeated any number of times desired.

After the desired number of passes, the spray head is retracted for the 5th step, as shown by the arrow 5. Finally, the jack 28 is lowered to return the vehicle body to the original position as represented by the downwardly directed arrow 6, at which time the vehicle can be moved forwardly between the units 30 and 32 and off the wheel receivers 22 and 24. Another vehicle then can be moved into place and the operation repeated. The overall undercoating operation can be performed in less than one minute with the actual coating steps requiring only approximately fifteen seconds, in a typical application.

Figure 3:
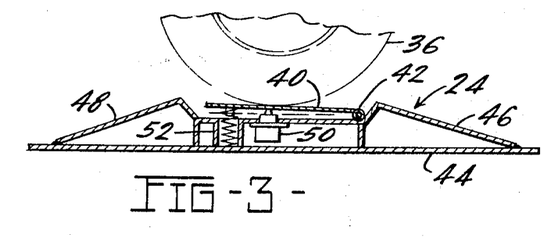
FIG. 3 is a view in vertical across section of a vehicle wheel receiver shown in FIG. 1.

Referring now to the various components of the overall apparatus 20, one of the wheel receivers 24 is shown in vertical longitudinal cross section in FIG. 3, the receiver 24 being basically similar to the receiver 22. The receiver 24, as shown in FIG. 3, includes a plate or platform 40 pivotally connected by a pin 42 to a support frame 44 having forward and rear ramps 46 and 48. Between the frame 44 and the platform 40 are a limit switch 50 which is open until depressed, and a heavy spring 52 which holds the platform 40 in an upper position above the switch 50. When a vehicle wheel is moved onto the platform 40, the weight of the vehicle overcomes the force of the spring 52 and depresses the switch 50, thereby closing it. Each of the receivers 22 and 24 is provided with a switch 50, and the four switches 50 are wired in series. When all four of the switches 50 are closed, the jack 28 is operated to raise the body and perform the first step of the coating operation. It is not essential to employ four of the switches 50 for the receivers 22 and 24, but preferably at least two for the front and for the rear wheel of the vehicle are desirable so that the switch for the front receiver 24 will not be closed by the rear wheel and start a false operation as the vehicle is moved forwardly after being coated. Four of the switches are preferred to reduce the possibility of accidental tripping by workmen.

Figure 4:
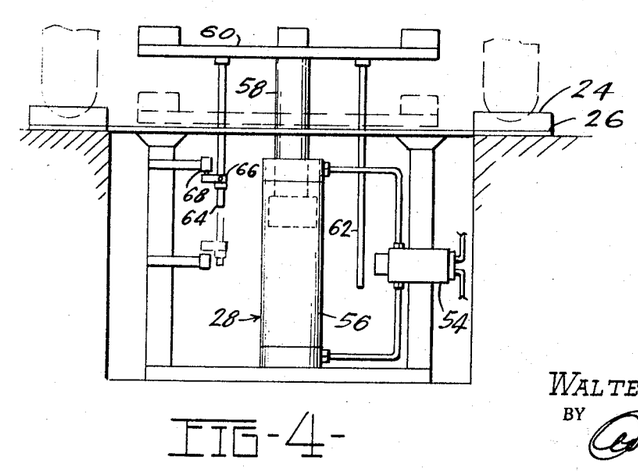
FIG. 4 is a front view in elevation of a jack assembly employed with the coating apparatus.

When the four switches are closed, a fluid, such as air, control valve 54 (FIG. 4) is energized to direct fluid, air for example, to a cylinder 56 of the jack 28, extending a piston rod or jack rod 58 thereof. A body-engaging bar 60 is mounted on the upper end of the jack piston rod 58, above the plate 26, to engage an appropriate part of the undercarriage of the vehicle behind the front bumper. Guide rods 62 and 64 depend from outer portions of the bar 60. The rod 64 has a flange 66 to engage and close a limit switch 68 when the jack rod 58 is extended. As discussed previously, the jack 28 raises the body of the vehicle to separate the front fenders and wheels to increase the space for the spray head 38.

Figure 5:
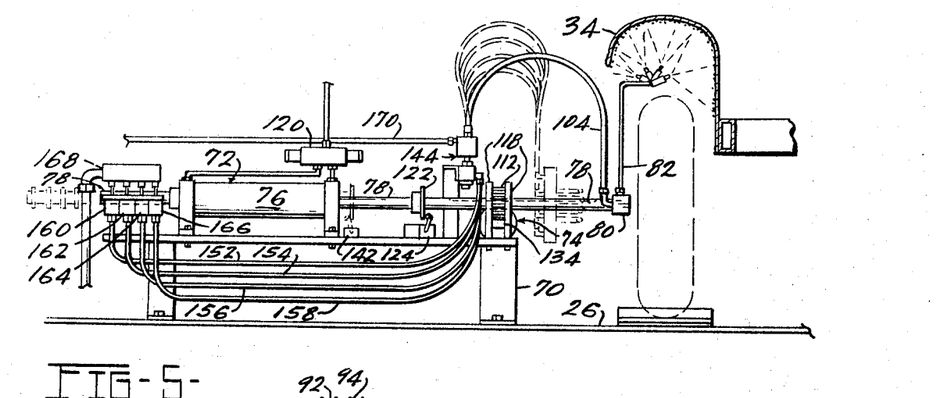
FIG. 5 is a front view in elevation of a spray control unit shown in FIG. 1, with certain components removed for clarity of illustration.
Figure 6:
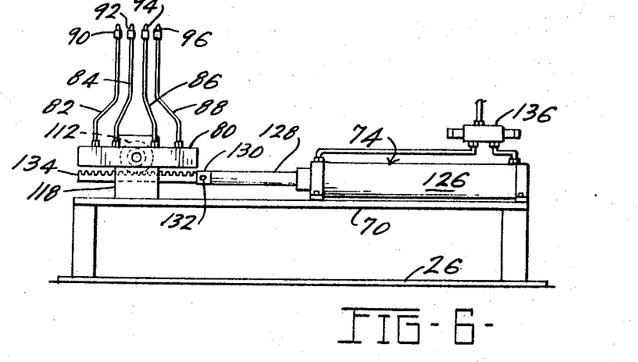
FIG. 6 is a right side view of the spray control unit of FIG. 5.
Figure 7:
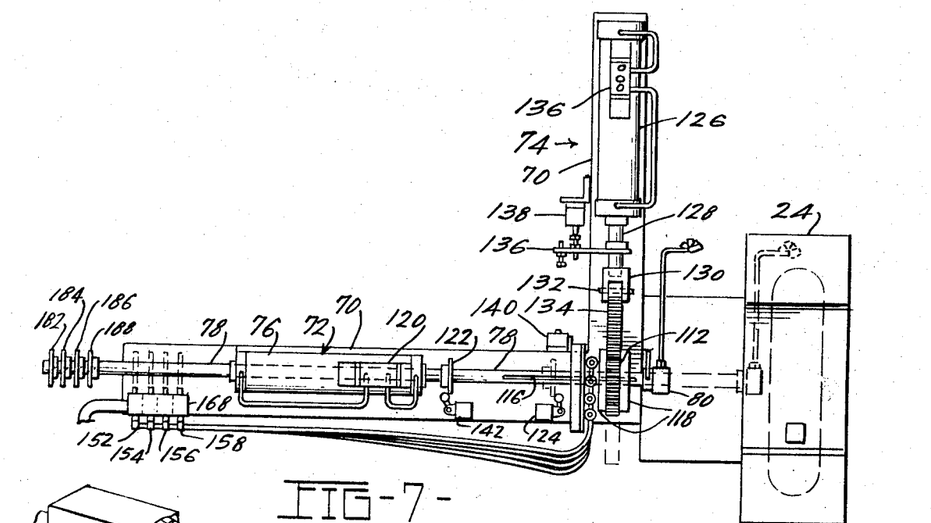
FIG. 7 is a plan view of the spray control unit of FIGS. 5 and 6.
Figure 9:
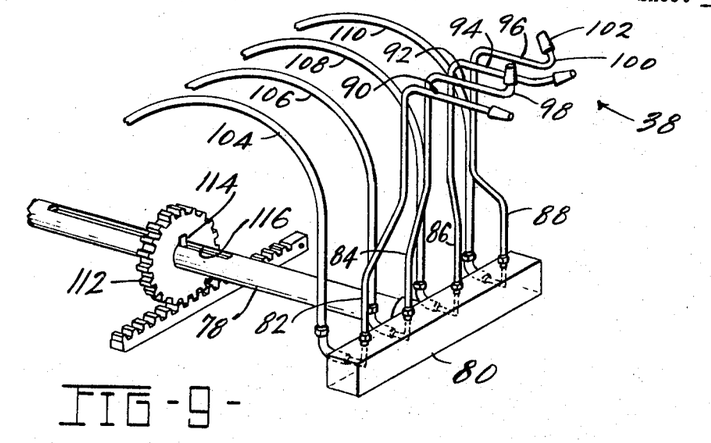
FIG. 9 is an enlarged, detailed view in perspective of a spray head.

Because the spray control units 30 and 32 are basically the same, except for being symmetrically opposite, only the unit 30 will be discussed in detail. Referring more particularly to FIGS. 5, 6 and 7, the unit 30 includes a suitable frame 70 supporting a first fluid-operated ram 72 and a second fluid-operated ram 74. The first ram 72 includes a fluid cylinder 76 and a piston rod 78 which extends completely through the cylinder. The ram 72 is supported on the frame 70 in a manner such that the piston rod 78, which also constitutes a support for the spray head 38, is positioned and moved coaxially with the axis of the front wheel of the vehicle, when in position. At the outer end of the piston rod 78 is a support member or bar 80 which carries four supply tubes 82, 84, 86 and 88 (see FIG. 9) extending transversely of the rod 78 for a distance slightly greater than the radius of the vehicle wheel. The supply tubes are bent in an L-shape configuration to form short legs 90, 92, 94 and 96 which are parallel to the rod 78. The second and fourth legs 92 and 96 then bend at right angles or other desired angles to form terminal portions 98 and 100. Spray nozzles 102 are suitably supported by and affixed to, as by threaded connections, the terminal ends of the supply tubes to complete the spray head 38. While the second and fourth nozzles extend generally perpendicular to the rod 78 and the first and third nozzles extend generally parallel to the rod 78, the nozzles can be directed in any suitable manner for the particular application and can even be directed back toward the ram 72. Coating material is supplied to the four nozzles 102 through flexible lines 104, 106, 108 and 110 which communicate with the tubes 82, 84, 86 and 88 through the supporting bar 80 and suitable fittings.

The piston rod 78 extends through a pinion gear 112 (FIGS. 5, 7 and 9) which is mounted on the piston rod 78 in a manner to enable relative longitudinal movement between the pinion and the rod but not relative rotation. In this instance, the mounting is accomplished by means of a key 114 (FIG. 9) and a keyway 116 in the rod 78. The pinion gear 112 is held in a given position by means of a pair of restraining and guide ears 118 (FIGS. 5–7) when the rod 78 moves between forward and retracted positions.

The movement of the ram 72 and the rod 78 is regulated by a control valve 120. When the microswitch 68 is closed by the guide rod flange 66, it causes the valve 120 to supply fluid to the rear of the ram 72 and extends the rod 78. This moves the spray head unit 38 from the retracted position (dotted lines, FIG. 7) to the forward position (solid lines, FIG. 7) in which the spray nozzles 102 and the leg portions 90–96 are located under a forward portion of the fender well, with the nozzles lying in a vertical plane extending through the vehicle wheel. When the nozzles 102 and the associated tubes 82–88 are extended and retracted they are disposed in a generally horizontal position as shown in FIGS. 2 and 7. When the spray head 38 is moved to the forward position, a switch plate 122 carried by the rod 78 energizes another microswitch 124 (FIGS. 5 and 7).

The second ram 74 (FIGS. 6 and 7) includes a cylinder 126 and a piston rod 128 affixed to a yoke 130. The yoke 130 is pivotally connected by a pin 132 to a rack 134 extending between the pinion gear 112 and the base of the restraining ears 118, being in mesh with the gear 112. When the piston rod 128 retracts and extends, it moves the rack 134 longitudinally and rotates the pinion gear 112. The pinion gear 112 similarly rotates the piston rod 78 and causes the spray head 38 to move in an arcuate path. The ram 74 is controlled through a valve 136 which causes the rod 128 to retract when the switch 124 is contacted by the plate 122. The valve 136 supplies power fluid to the front end of the cylinder 126 and retracts the piston rod 128 to cause the rack to rotate the pinion 112 and the rod 78. The spray head 38 is then moved through an arcuate path having its center at the center of the vehicle wheel, but having a larger radius, until the spray unit reaches approximately a horizontal position extending toward the rear of the vehicle, as shown in dotted lines in FIG. 2. This completes the third step of the coating operation.

When the rod 128 has retracted fully, a transverse plate or flange 136 (FIG. 7) carried on the rod 128 engages a microswitch 138 which causes the valve 136 to supply fluid to the rear of the cylinder 126 to extend the piston rod 128 again. The first piston rod 78 and the spray head 38 then move back through the arcuate path to the original position when the piston rod 128 reaches its extended position. This motion completes the fourth step of the coating operation.

When the piston rod 128 reaches the extended position, the flange 136 engages a microswitch 140 which, through the valve 120, causes the cylinder 76 to retract the piston rod 78. The spray head 38 moves to the retracted position away from the vehicle and thereby completes the fifth step of the coating operation.

When the piston rod 78 reaches the retracted position, the flange 122 contacts a microswitch 142 (FIGS. 5 and 7) which causes the valve 54 to lower the jack rod 58 and lower the vehicle body. This completes the sixth step of the coating operation and, at this time, the vehicle can be moved forwardly beyond the spray control units 30 and 32 and to the next step on the production line. While the rear wheels of the vehicle will close the forward microswitches when rolled over the receivers 24, another cycle will not be started because the rear microswitches remain open.

Of course, other sequencing means can be used to control the cycle of operations, such as timer operated control cams or the like.

The undercoating material can be sprayed during the entire forward and reverse arcuate strokes of the spray head 38 or the material can be supplied only during specific portions of the strokes. In some instances, it is preferred not to coat the entire undersurface of the fender well as, for example, when a shock absorber is to be attached to a connection in the normal path of the coating material spray. To provide the desired spray and coating material coverage, supply valves 144, 146, 148 and 150 (FIG. 8) are provided for the supply lines 104, 106, 108 and 110, respectively. These valves are normally closed and are opened when supplied with air at a predetermined pressure through control lines 152, 154, 156 and 158, respectively. The control lines 162–158, in turn, communicate with poppet valves 160, 162, 164 and 166 to which air is supplied through a manifold 168. When one of the valves 160–166 is opened, air is supplied from the manifold 168 through the open valve to the respective one of the coating material supply valves 144–150. This opens the respective supply valve to cause coating material to be supplied from the respective supply lines 170, 172, 174 or 176 to the respective tubes 82, 84, 86 or 88 and the associated nozzle 102. Thus, the coating material supply for each of the nozzles 102 is entirely independent and separately controlled.

Figure 8:
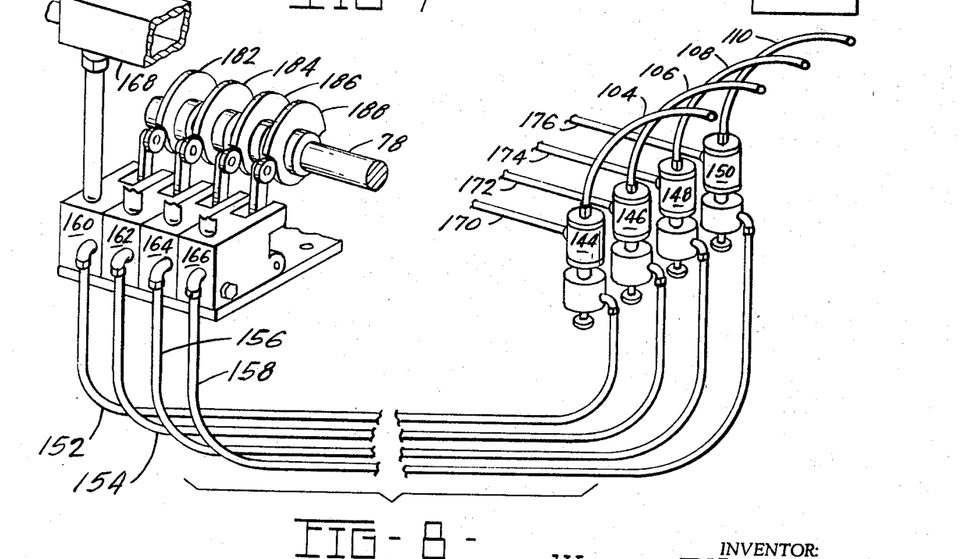
FIG. 8 is a fragmentary view in perspective of apparatus for controlling the flow of coating material to a spray head of the spray control unit.
Figure 10:
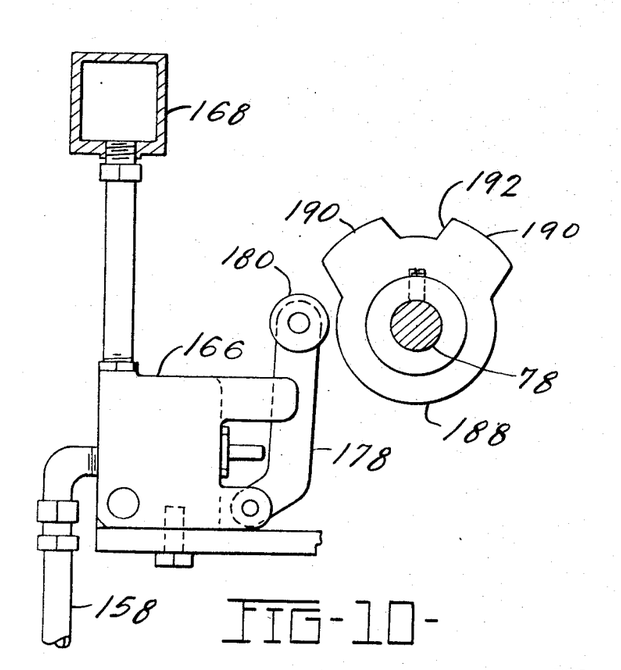
FIG. 10 is a detailed view of certain components shown in FIG. 8.

As shown in FIG. 10, each of the poppet valves 160–166, number 166 being shown, includes a pivoted arm 178 with a roller 180 at the outer end, the poppet valves 160–166 being individually controlled by separate cams 182–188 (FIGS. 7, 8 and 10). The cams are positioned so that when the piston rod 128 is in its forward position and the spray head 38 is to the extreme left position as viewed in FIG. 2, the cams 182–188 will clear the arm rollers 180 when the piston rod 78 is moved back and forth. Hence, the cam 188 will be substantially in the position shown in FIG. 10 when the piston rod 78 is moved between the retracted and the forward positions. All of the cams 182–188 are entirely rearward of the poppet valves 160–166 when the piston rod 78 is in its retracted position. With the piston rod forwardly, however, the cams are aligned with their respective poppet valve arms.

Each of the cams can be distinctly shaped to provide a particular sequence or pattern for the coating material supplied to the respective nozzle 102. In this instance, the cam 188 has a first high sector 190, an intermediate notch 192, and a second high sector 194. When the piston rod 128 begins to retract and rotates the piston rod 78, the first high sector 190 of the cam 188 will cause the arm 178 to open the valve 166 to supply air through the control line 158 to the supply control valve 150 and open this valve to supply coating material through the line 176 and the flexible line 110 to the supply tube 88 and the upwardly extending nozzle 102 on the terminal portion 100 of the leg 96. As the spray head 38 moves in a clockwise direction, in FIG. 2, the roller 180 of the arm 178 will drop into the notch 192 and shut off the poppet valve 166 thereby stopping flow of coating material to the spray nozzle 102 on the tube portion 100. The supply is temporarily shut off until the cam sector 194 contacts the roller 180 and moves the arm 178 again to open the valve 166. The notch 192 is positioned so that the flow of coating material through the nozzle will be shut off at the desired part of the stroke to prevent a particular part of the fender well from being coated. Of course, depending upon the application, some of the cams 182–188 may not contain any notch portions at all but cause coating material to be supplied through substantially the entire forward and return strokes representing steps 3 and 4 of the coating cycle. On the other hand, some cams may have two or more notches to provide temporary shut-off of the coating material supplied to the respective valve at two or more points during the arcuate movements of the spray head 38.

To review the overall operation of the coating apparatus, when a vehicle is moved into the proper position on the wheel receivers 22 and 24, the jack 28 is operated to raise the body of the vehicle and provide additional space between the front wheels and front fenders. Each of the spray heads 38 is then moved forwardly by the ram 72 to a point where the spray head is under the fender well. The spray head 38 is then moved in an arcuate path by the second ram 74 around the wheel with the center of the path being at the axis of the wheel and with the radius of the path exceeding the radius of the wheel. Preferably after a forward and backward arcuate movement the spray head 38 again is retracted by the ram 72, at which time the jack lowers the body of the vehicle and the vehicle is moved to the next station in the production line. The coating material can be supplied to the coating material nozzles 102 individually, and can be shut off during any predetermined portion of the arcuate movement of the spray head 38.

I claim:

1. Apparatus for applying undercoating material to front fender wells of automobiles, said apparatus comprising means forming two rear and two front wheel receivers, switch means associated with said receiver means, said switch means being closed when wheels of an automobile are moved onto all four of said receiver means, a jack centrally located between said front wheel receiver means in a position below the undercarriage of the automobile, said jack including a fluid-operated jack ram, a jack piston rod, and a bar for contacting the front portion of the undercarriage of the automobile, said bar being affixed to said jack piston rod, means for supplying fluid to said jack ram, first valve means responsive to the closing of all four switch means for supplying fluid to said jack ram to raise the automobile body to a predetermined distance with the front wheels still in contact with said receiver means, a spray assembly on each side of the front wheel receiver means, each of said spray assemblies comprising a transverse fluid-operated ram having a transverse piston rod positioned to be substantially coaxially located with respect to the axis of a front wheel of the automobile when on said receiver means, a bar on the forward end of said transverse piston rod, a plurality of supply tubes extending outwardly from said bar and having lengths slightly greater than the radius of the associated front wheel, a plurality of nozzles carried by the outer ends of said tubes and pointed in different directions, a separate, flexible supply line fo reach of said nozzles and said supply tubes, a pinion gear keyed to said transverse piston rod for only relative axial movement with respect thereto, means holding said pinion gear in a fixed position relative to said transverse ram, means actuated by said jack ram for operating said transverse ram after said jack ram is in the upper position, a rack engageable with said pinion gear, a sweep fluid-operated ram having a sweep piston rod connected at its outer end to one end of said rack, means operated after said transverse piston rod reaches the forward end of its stroke for operating said sweep fluid-operated ram, means operated after said sweep piston rod reaches the rearward end of its stroke for causing said sweep piston rod to extend, means operated after said sweep piston rod reaches the forward end of its stroke for causing said transverse piston rod to retract, means operated after said transverse piston rod retracts to operate said jack ram to lower the automobile, a pneumatically-operated valve for each of said coating material supply lines, a plurality of cams affixed to a rear portion of said transverse piston rod beyond the rear end of said transverse ram, a plurality of poppet valves, one for each of said pneumatically-operated valves located adjacent the rear portion of said transverse piston rod behind said transverse ram, said poppet valves having arms positioned to be operated by said cams when said transverse piston rod is in its forward position, means for supplying air to said poppet valves, and means connecting said poppet valves and said coating material supply valves for supplying air to said supply valves to open same when said poppet valves are opened by said cams to control the supply of undercoating material to said nozzles.

2. Apparatus for applying undercoating material to front fender wells of an automobile, said apparatus comprising means forming rear and front wheel receivers, switch means associated with said receiver means, said switch means being closed when wheels of an automobile are moved onto said receiver means, a spray assembly on each side of the front wheel receiver means, a jack centrally located between said spray assemblies in a position to be below the undercarriage of the automobile, said jack including a fluid-operated jack ram, means responsive to the closing of said switch means for causing said jack ram to raise the automobile body a predetermined distance with the wheels still in contact with said front receiver means, each of said assemblies comprising a transverse fluid-operated ram having a transverse piston rod positioned to be substantially coaxially located with respect to the axis of a front wheel of the automobile when on said front receiver means, a plurality of supply lines extending outwardly from the forward end of said transverse piston rod and having a length slightly greater than the radius of the associated front wheel, a plurality of nozzles carried by the outer ends of said lines and pointed in different directions, a separate, flexible line for each of said nozzles and said supply lines, a pinion gear keyed to said transverse piston rod for only relative axial movement with respect thereto, means holding said pinion gear in a fixed position relative to said transverse ram, a rack engageable with said pinion gear, means for operating said transverse ram after said jack ram is in the upper position, a sweep fluid-operated ram having a sweep piston rod connected to one end of said rack, a pneumatically-operated valve for each of said coating materal supply lines, a plurality of cams, one for each of said valves, carried by a rear portion of said transverse piston rod beyond the rear end of said transverse ram, a poppet valve for each of said pneumatically-operated valves located beyond the rear end of said transverse ram, adjacent the rear portion of said transverse piston rod, said poppet valve having arms positioned to be operated by said cams when said transverse piston rod is in its forward position, means for supplying air to said poppet valves, means connecting said poppet valves and said coating material supply valves for supplying air to said supply valves to operate same when said poppet valves are opened by said cams to control the supply of undercoating material to said nozzles.

3. Apparatus for applying undercoating material to front fender wells of an automobile, said apparatus comprising means forming rear and front wheel receivers, switch means associated with said receiver means, said switch means being closed when wheels of an automobile are moved onto said receiver means, a spray assembly located in a predetermined position relative to the front wheel receiver means and on each side of the front wheel receiver means, a jack centrally located between said front wheel receiver means and between said spray assemblies in a position to be below the undercarriage of the automobile, said jack including a fluid-operated jack ram, means responsive to the closing of said switch means for causing said jack ram to raise the automobile body a predetermined distance when its wheels engage said receiver means, means for operating said spray assemblies only when said jack is in the raised position, each of said assemblies comprising a transverse fluid-operated ram having a transverse piston rod positioned to be substantially coaxially located with respect to the axis of a front wheel of the automobile when on said front receiver means, support means extending outwardly from the forward end of said transverse piston rod and having a length slightly greater than the radius of the associated front wheel, a plurality of nozzles carried by the outer end of said support means and pointed in different directions, a separate, flexible supply line for each of said nozzles, a pinion gear attached to said transverse piston rod for only relative axial movement with respect thereto, means holding said pinion gear in a fixed position relative to said transverse ram, a rack engageable with said pinion gear, a sweep fluid-operated ram having a sweep piston rod connected to said rack, a supply valve for each of said supply lines, a plurality of cams, one for each of said valves, carried by a portion of said transverse piston rod, a control valve for each of said valves positioned to be operated by said cams when said transverse piston rod is in its forward position, means connecting said control valves and said coating material supply valves to operate same when said control valves are opened by said cams to control the supply of undercoating material to said nozzles.

4. Apparatus for applying undercoating material to a fender well of an automobile, said apparatus comprising means forming rear and front wheel receivers, switch means associated with said receiver means, a jack positioned in a predetermined location relative to said receiver means to be below the undercarriage of the automobile when its wheels engage said receiver means and close said switch means to raise the automobile body a predetermined amount, a spray assembly located in a predetermined position relative to the front wheel receiver means at one side of the front wheel receiver means, means for operating said spray assembly only when said jack is in the raised position, said assembly comprising a transverse fluid-operated ram having a transverse piston rod positioned to be substantially coaxially located with respect to the axis of a front wheel of the automobile when on said front receiver means, support means extending outwardly from said transverse piston rod and having a length slightly greater than the radius of the associated front wheel, a plurality of nozzles carried by the outer end of said support means and pointed in different directions, a separate, flexible supply line for each of said nozzles, a pinion gear attached to said transverse piston rod for only relative axial movement with respect thereto, means holding said pinion gear in a fixed position relative to said transverse ram, a rack engageable with said pinion gear, a sweep fluid-operated ram having a sweep piston rod connected to said rack, a supply valve for each of said supply lines, a plurality of cams, one for each of said valves, carried by a portion of said transverse piston rod, control means for each of said valves positioned to be operated by said cams when said transverse piston rod is in its forward position, means connecting said control means and said supply valves to operate same to control the supply of undercoating material to said nozzles.

5. Apparatus for applying undercoating material to a fender well of an automobile, said apparatus comprising means for aiding in locating the automobile in a predetermined position, a spray assembly located in a predetermined position relative to said locating means on each side of the position to be assumed by the automobile, a jack centrally located in a predetermined position relative to said locating means and between said assemblies and in a position to raise the automobile body a predetermined amount, means for initiating operation of said jack when the automobile is in the predetermined position, means for operating said spray assemblies only when said jack is in its raised position, each of said spray assemblies comprising a transverse fluid-operated ram having a transverse piston rod substantially coaxially located with respect to the axis of a wheel of the automobile when in position, a plurality of nozzles, support means on the forward end of said transverse piston rod having a length slightly greater than the radius of a wheel of the automobile for supporting said nozzles at the outer end of said support means, a separate supply line for each of said nozzles, a sweep ram, means connected to said sweep ram for rotating said transverse piston rod when in the forward position, a valve for each of said coating material supply lines, a plurality of cams, one for each valve, carried by a portion of said transverse piston rod, and a plurality of responsive means, one for each of said cams, for operating said valves in response to said cams when said transverse piston rod is in its forward position.

6. Apparatus for applying undercoating material to a fender well of an automobile, said apparatus comprising means for aiding in locating the automobile in a predetermined position, a spray assembly located in a predetermined position relative to said locating means on each side of the position to be assumed by the automobile, means positioned relative to said locating means to raise the automobile body a predetermined amount, means for actuating said raising means when the automobile is in the predetermined position, means for operating said spray assemblies only when said raising means is in its raised position, each of said spray assemblies comprising a first elongate support, means for moving said support in a path parallel to the axis of a front wheel of the automobile when in position, a plurality of nozzles, support means on the forward end of said first support and having a length slightly greater than the radius of a wheel of the automobile for supporting said nozzles at the outer end of said support means, a separate supply line for each of said nozzles, means for rotating said first support when in a forward position about an axis coaxial with the axis of the front wheel of the automobile when in position, a valve for each of said coating material supply lines, and a plurality of control means, one for each of said valves, for selectively and individually operating said valves when said support means is in a forward position.

7. Apparatus for applying undercoating material to a fender well of an automobile, said apparatus comprising means for aiding in locating the automobile in a predetermined position, a spray assembly located in a predetermined position relative to said locating means on each side of the position to be assumed by the automobile, means located in a predetermined position relative to said locating means for separating a wheel from the body of the automobile by a predetermined amount, means for operating said separating means when the automobile is in the predetermined position, means for operating said spray assemblies only when the wheel is separated from the body by the predetermined amount, each of said spray assemblies comprising a first support, means for reciprocating said support in a predetermined path, a nozzle, support means on said first support and having a length greater than the radius of a wheel of the automobile for supporting said nozzle at the outer end of said support means, supply line means for said nozzle, means for rotating said first support when in a forward position, valve means for said supply line means, and control means for operating said valve means when said first support is rotated.

8. Apparatus for applying undercoating material to a fender well of an automobile, said apparatus comprising means for aiding in locating the automobile in a predetermined position, a spray assembly located in a predetermined position relative to said locating means and at one side of the position to be assumed by the automobile, means for operating said spray assembly when the automobile is in the predetermined position, said assembly comprising a first support, means for reciprocating said support in a predetermined path, a nozzle, support means on said first support and having a length greater than the radius of a wheel of the automobile, for supporting said nozzle at the outer end of said support means, means for moving said first support back and forth in an arcuate path of predetermined radius exceeding the radius of the wheel and having an included angle substantially less than 360°, supply line means for said nozzle, valve means for said supply line means, and control means for operating said valve means when said first support is rotated.

9. Apparatus for applying undercoating material to a fender well of an automobile, said apparatus comprising means for aiding in locating the automobile in a predetermined position, a spray assembly located in a predetermined position relative to said locating means and at one side of the position to be assumed by the automobile, means for operating said spray assembly only when the automobile is in the predetermined position, said assembly comprising a first support, a nozzle, support means extending transversely of said first support and having a length greater than the radius of a wheel of the automobile, for supporting said nozzle at the outer end of said support means, means for moving said first support back and forth in an arcuate path of predetermined radius exceeding the radius of the wheel and having an included angle between 140° and 200°, supply line means for said nozzle, valve means for said supply line means, and control means for operating said valve means when said first support is rotated.

10. Apparatus for applying undercoating material to front fender wells of an automobile, said apparatus comprising means forming rear and front wheel receivers, switch means associated with said receiver means, said switch means being closed when wheels of an automobile are moved onto said receiver means, a spray assembly on each side of the front wheel receiver means, a jack centrally located between said spray assemblies in a position to be below the undercarriage of the automobile, said jack including a fluid-operated jack ram, means responsive to the closing of said switch means for causing said jack ram to raise the automobile body a predetermined distance with the wheels still in contact with said front receiver means, each of said assemblies comprising a transverse fluid-operated ram having a transverse piston rod positioned to be substantially coaxially located with respect to the axis of a front wheel of the automobile when on said front receiver means, a plurality of supply lines extending outwardly from the forward end of said transverse piston rod and having a length slightly greater than the radius of the associated front wheel, a plurality of nozzles carried by the outer ends of said lines and pointed in different directions, a separate, flexible line for each of said nozzles and said supply lines, a pinion gear keyed to said transverse piston rod for only relative axial movement with respect thereto, means holding said pinion gear in a fixed position relative to said transverse ram, a rack enagageable with said pinion gear, means for operating said transverse ram after said jack ram is in the upper position, a sweep fluid-operated ram having a sweep piston rod connected to one end of said rack, a valve for each of said coating material supply lines, and means for initiating operation of said spray assemblies only when the automobile body is raised by said jack.

11. Apparatus for applying undercoating material to front fender wells of an automobile, said apparatus comprising means forming rear and front wheel receivers, switch means associated with said receiver means, said switch means being closed when wheels of an automobile are moved onto said receiver means, a spray assembly located in a predetermined position relative to said front wheel receiver means on each side of the front wheel receiver means, a jack centrally located between said spray assemblies in a fixed position relative to said receiver means and in a position to be below the undercarriage of the automobile, said jack including a fluid-operated jack ram, means responsive to the closing of said switch means for causing said jack ram to raise the automobile body a predetermined distance, means for operating said spray assemblies only when said jack is in the raised position, each of said assemblies comprising a transverse fluid-operated ram having a transverse piston rod positioned to be substantially coaxially located with respect to the axis of a front wheel of the automobile when on said front receiver means, support means extending outwardly from the forward end of said transverse piston rod and having a length slightly greater than the radius of the associated front wheel, a plurality of nozzles carried by the outer end of the said support means and pointed in different directions, a separate, flexible supply line for each of said nozzles, a pinion gear attached to said transverse piston rod for only relative axial movement with respect thereto, means holding said pinion gear in a fixed position relative to said transverse ram, a rack engageable with said pinion gear, a sweep fluid-operated ram having a sweep piston rod connected to said rack, and a supply valve for each of said supply lines.

12. Apparatus for applying undercoating material to a fender well of an automobile, said apparatus comprising means forming rear and front wheel receivers, switch means associated with said receiver means, a jack positioned in a predetermined location relative to said receiver means to be below the undercarriage of the automobile when its wheels engage said receiver means to raise the automobile body a predetermined amount when said switch means is engaged by a wheel of the automobile, a spray assembly in a predetermined position relative to said receiver means to one side of the front wheel receiver means, means for operating said spray assembly only when said jack is in the raised position, said assembly comprising a transverse fluid-operated ram having a transverse piston rod positioned to be substantially coaxially located with respect to the axis of a front wheel of the automobile when on said front receiver means, support means extending outwardly from said transverse piston rod and having a length slightly greater than the radius of the associated front wheel, a plurality of nozzles carried by the outer end of said support means and pointed in different directions, a separate, flexible supply line for each of said nozzles, a pinion gear attached to said transverse piston rod for only relative axial movement with respect thereto, means holding said pinion gear in a fixed position relative to said transverse ram, a rack engageable with said pinion gear, a sweep fluid-operated ram having a sweep piston rod connected to said rack, and supply valve means for said supply lines.

13. Apparatus for applying undercoating material to a fender well of an automobile, said apparatus comprising means for aiding in locating the automobile in a predetermined position, a spray assembly positioned in a predetermined location relative to said locating means and located on each side of the position to be assumed by the automobile, a jack located in a fixed position relative to said locating means and centrally located between said assemblies and in a position to raise the automobile body a predetermined amount, means for operating said jack when the automobile is in the predetermined position, means for operating said spray assemblies only when said jack is in the raised position, each of said spray assemblies comprising a transverse fluid-operated ram having a transverse piston rod substantially coaxially located with respect to the axis of a front wheel of the automobile when in position, a plurality of nozzles, support means on the forward end of said transverse piston rod having a length slightly greater than the radius of a wheel of the automobile for supporting said nozzles at the outer end of said support means, separate supply line means for each of said nozzles, a sweep ram, and means connected to said sweep ram for rotating said transverse piston rod when in the forward position.

14. Apparatus for applying undercoating material to a fender well of an automobile, said apparatus comprising means for aiding in locating the automobile in a predetermined position, a spray assembly positioned in a predetermined location relative to said locating means and located on each side of the position to be assumed by the automobile, means located in a predetermined position relative to said locating means and positioned to raise the automobile body a predetermined amount, means for operating said raising means when the automobile is in the predetermined position, means for operating said spray assemblies only when said raising means is in the raised position, each of said spray assemblies comprising a first elongate support, means for moving said support in a path parallel to the axis of a wheel of the automobile when in position, a plurality of nozzles, support means on the forward end of said first support and having a length slightly greater than the radius of a wheel of the automobile for supporting said nozzles at the outer end of said support means, supply line means for said nozzles, and means for rotating said first support when in a forward position about an axis coaxial with the axis of the wheel of the automobile when in position.

15. Apparatus for applying undercoating material to a fender well of an automobile, said apparatus comprising means for aiding in locating the automobile in a predetermined position, a spray assembly positioned in a predetermined location relative to said locating means and located on each side of the position to be assumed by the automobile, means located in a fixed position relative to said locating means for separating a wheel from the body of the automobile by a predetermined amount, means for operating said separating means when the automobile is in the predetermined position, means for operating said spray assemblies only when said separating means separates the wheel from the body by the predetermined amount, each of said spray assemblies comprising a first support, means for reciprocating said support in a predetermined path, a nozzle, support means on said first support and having a length greater than the radius of a wheel of the automobile for supporting said nozzle at the outer end of said support means, supply line means for said nozzle, and means for rotating said first support when in a forward position.

16. Apparatus for applying undercoating material to a fender well of an automobile, said apparatus comprising means for aiding in locating the automobile in a predetermined position, a spray assembly located in a predetermined position relative to said locating means and and at one side of the position to be assumed by the automobile, means for operating said spray assembly when the automobile is in the predetermined position, said assembly comprising a first support, means for reciprocating said support in a predetermined path, a nozzle, support means on said first support and having a length greater than the radius of a wheel of the automobile, for supporting said nozzle at the outer end of said support means, and means for moving said first support back and forth in an arcuate path of a predetermined radius exceeding the radius of the wheel and having an included angle of from 140° to about 200°.

17. Apparatus for coating the surface of a fender well of a vehicle with a wheel partly disposed in the well, said apparatus comprising means for providing relative movement between said fender well and said wheel to increase the spacing therebetween, means for supporting and positioning a spray head in a fixed position relative to said movement means at a point to one side of said wheel and below said fender well, means for moving said spray head in an arcuate path around said wheel while directing spray toward said fender well when the spacing between said fender well and said wheel is increased, said path having a center at the axis of the wheel when the wheel is in the position in which the spacing is increased and having a radius exceeding the radius of the wheel, and means for supplying coating material to said spray head in at least a predetermined portion of the path of said spray head.

18. Apparatus for coating the surface of a fender well of a vehicle with a wheel partly disposed in the well, said apparatus comprising means for providing relative movement between the fender well and the wheel to increase the spacing therebetween, means for supporting and positioning a spray head at a point to one side of said wheel and below said fender well, means for moving said spray head in an arcuate path around said wheel while directing spray toward said fender well only when the spacing between the fender well and the wheel has been increased, said path having a center at the axis of the wheel and having a radius exceeding the radius of the wheel, and means for supplying coating material to said spray head.

References Cited

UNITED STATES PATENTS

| | | | |
|---|---|---|---|
| 1,982,763 | 12/1934 | Russell et al. | 118—323 XR |
| 2,695,592 | 11/1954 | Szczepanski | 118—323 XR |
| 2,955,568 | 10/1960 | Blenman et al. | 118—323 |
| 3,237,598 | 3/1966 | Zahn | 118—323 XR |
| 3,252,442 | 5/1966 | Hazlett | 118—8 |

ALFRED L. LEAVITT, *Primary Examiner.*

J. H. NEWSOME, *Assistant Examiner.*

U.S. Cl. X.R.

117—48, 96, 104; 118—12, 323, 317, 315; 134—45

PO-1050
(5/69)

UNITED STATES PATENT OFFICE
CERTIFICATE OF CORRECTION

Patent No. 3,448,717                    Dated  June 10, 1969

Inventor(s)  Walter F. Kuhlman

It is certified that error appears in the above-identified patent and that said Letters Patent are hereby corrected as shown below:

In Column 5, line 53, "162-158" should read -- 152-158 --; lines 60 and 61, "lines" and "tubes" should both be singular. In Column 6, line 73, delete "to" (second occurrence). In Column 7, line 11, "fo reach" should read -- for each --; line 75, correct the spelling of "material". In Column 11, line 10, correct the spelling of "engageable"; lines 25 and 26, delete "on each side of the front wheel receiver means"; line 42, delete "the".

SIGNED AND
SEALED
MAR 31 1970

(SEAL)
Attest:

Edward M. Fletcher, Jr.
Attesting Officer

WILLIAM E. SCHUYLER, JR.
Commissioner of Patents